United States Patent
Pope

[15] 3,702,035
[45] Nov. 7, 1972

[54] FISH LURE
[72] Inventor: Melkiah E. Pope, Valencia, Calif.
[73] Assignee: Pope Manufacturing, Inc.
[22] Filed: June 4, 1970
[21] Appl. No.: 43,414

[52] U.S. Cl............. 43/42.35, 43/42.47, 43/42.48
[51] Int. Cl. ............................................ A01k 85/00
[58] Field of Search............... 43/42.35, 42.47, 42.48

[56] References Cited

UNITED STATES PATENTS

| | | | |
|---|---|---|---|
| 1,492,228 | 4/1924 | Smith | 43/42.48 |
| 2,866,292 | 12/1958 | Busch | 43/42.48 |
| 218,822 | 9/1970 | Pope | 43/42.48 UX |
| 2,924,906 | 2/1960 | Lindquist | 43/42.35 |
| 2,641,862 | 6/1953 | Poe | 43/42.35 |
| 2,522,179 | 9/1950 | Jensen, Sr. et al. | 43/42.35 |
| 2,621,438 | 12/1952 | Helin | 43/42.48 |

Primary Examiner—Melvin D. Rein
Attorney—Ford W. Harris, Jr. et al.

[57] ABSTRACT

A fish lure having an arcuate shape and a curved triangular shaped head with flanged edges on the triangular head. The head tapers sharply so that the interaction of the fish lure with water causes a narrow rapid tail action plus sideways erratic darting, so as to be very imitative of a fish.

4 Claims, 5 Drawing Figures

PATENTED NOV 7 1972 3,702,035
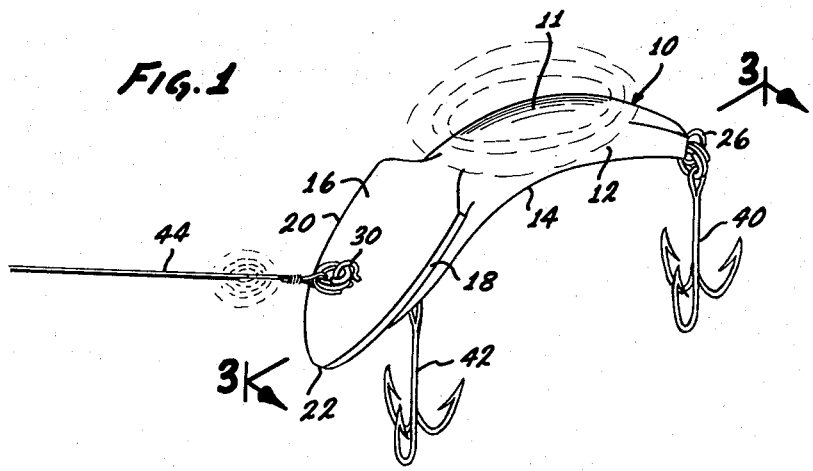
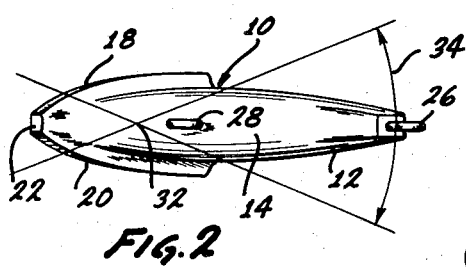
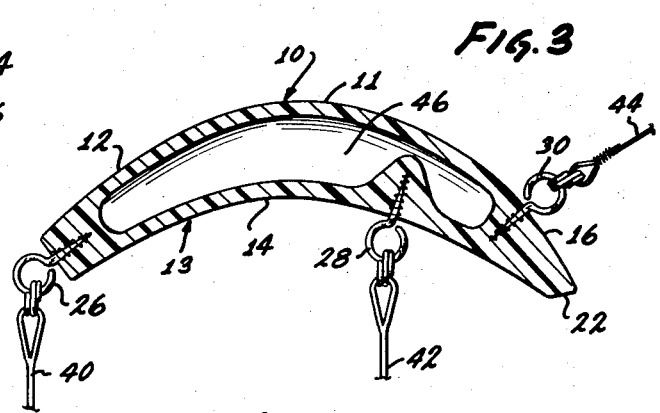
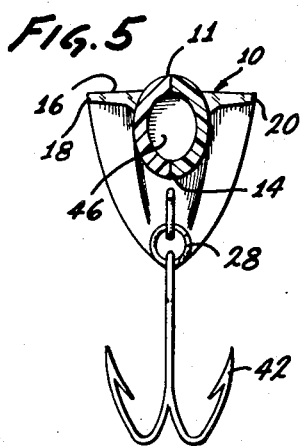
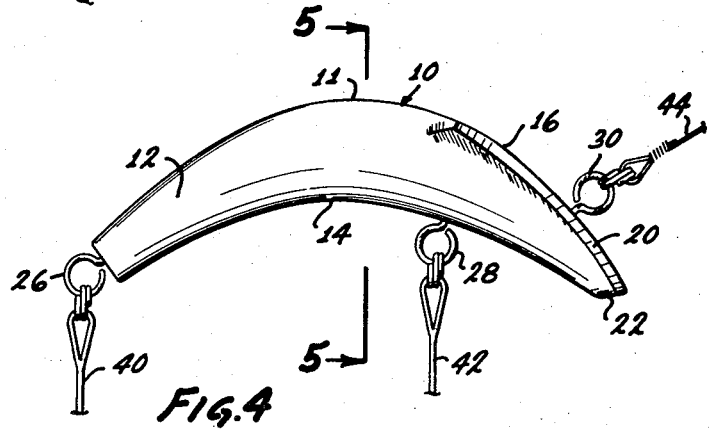
INVENTOR
MELKIAH E. POPE
BY Herzig & Walsh
ATTORNEYS

FISH LURE

SUMMARY OF THE INVENTION

This invention relates generally to fishing lures and more particularly to a fishing lure that interacts with water so as to be very attractive to fish.

Fishing lures are well known as decoys or bait for fish. They are attached to the end of a fishing line that the fisherman has thrown into the water and are used to attract fish. There are many different shapes and materials used for fishing lures but the desired end result in most cases is a fish lure that imitates a fish.

Almost all plastic lures are constructed with some hollow space inside to provide a tendency toward flotation. This allows a fish lure to remain in an upright position as it runs through the water. Typical plastic lures have an air space in them and have one of three kinds of action in the water. The first and by far most common action is a pivoting on a vertical axis from side to side. This axis runs through the lure to the rear of the center of the lure, causing the front end to travel considerably farther from side to side than the rear of the lure. The second type of action is a rolling action along a horizontal axis. This action is accomplished by having a relatively long narrow lure with a small lip near the front of the lure of an enlarged angle from the axis of the lure. The third type of action is a rapid swinging action by the lower part of the lure which is usually thin in width and having a flat surface on part of the top edge. In this type lure, the flat surface is usually only as wide as the body. In each of these three cases, the actual action whichever type it might be, is caused by the water pressure on the flat or near flat surface. The water pressure builds up until the flat surface moves or rotates to the side releasing the pressure. This movement causes the rest of the body to swing or roll, depending upon the size and shape of the flat area in relation to the size and balance of the body. The usual movement of these type lures is one that is different than a real fish would make. The end result is a fish lure that does not truly resemble a small fish, for example, a minnow such that other bigger fish find the lure desirable enough so as to bite at it, thinking that the lure is a fish and therefore food.

The fish lure of the present invention has a new and unique action in the water so as to more nearly resemble a small fish, for example, a minnow. The arcuate shape is very important to the balance of the lure and the very unique portion of this lure is the shape and size of the head in and of itself and in relation to the size and balance of the body. The curved, triangular shaped head with flanged edges, tapering sharply at the wide end of the triangle to the more narrow body is the physical feature most significantly responsible for the unique action of imitating a small fish. This narrow body extends up and under the head. The head is triangular only in general appearance as the front is blunt and edges are curved, each factor being important to the action. From a side profile view, the head is also curved.

In light of the foregoing, the primary object of the invention is to provide an improved and more effective fish lure than is known to the prior art.

If is another object of this invention to provide a fish lure with a unique fish-like action.

Still another object of this invention is to provide a fish lure with a body shaped to aid in the balance of the fish lure.

Yet another object of the invention is to provide a fish lure with flanges on the side of the head.

A further object of the invention is to provide a fish lure having a minnow-like action so as to be attractive to fish.

Further objects and additional advantages of the invention will become apparent from the following detailed description and annexed drawings wherein:

FIG. 1 is a perspective view of an exemplary fish lure embodying the features of the present invention;

FIG. 2 is a bottom view of the fish lure of the present invention;

FIG. 3 is a sectional view of the fish lure of the present invention taken substantially along the line 3 — 3 of FIG. 1;

FIG. 4 is a side view of the fish lure of the present invention; and

FIG. 5 is a sectional view of the fish lure of the present invention taken substantially along line 5 — 5 of FIG. 4.

In accordance with the present invention, a fish lure 10 is shown attached to a fishing line 44 by means of eyelet 30 in FIG. 1. Eyelets 26 and 28 (FIG. 2) are shown and have attached thereto conventional fishhooks 40 and 42. The forward end of the fish lure is comprised of a flat surface 16 which is primarily triangular in shape The forward section is bounded by forward tip 22 and side flanges 18 and 20 (FIG. 2). As can be seen, the front surface 16 is curved and tapers down at the point of the forward tip 22. The rear portion 12 of the fish lure is arcuate shaped and has a generally convex side 11 facing upward and a concave side 14 facing downward.

FIG. 2 of the drawings shows a bottom view of the fish lure 10 of the present invention. Flanges 18 and 20 are shown curving down to the forward tip 22. Concave surface 14 is shown in which eyelets 26 and 28 are attached to the rear and middle of the surface 14. As the lure moves, water strikes the lure on the entire surface 16. That portion of the water that strikes the portion of the triangular shaped head (surface 16) behind eyelet 30 causes the rear portion of the lure to swing along arc 34 in a manner to be explained later. That portion of the water that strikes the section of the surface 16 in front of eyelet 30 causes the darting from side to side — also to be explained later.

The fish lure 10 of the present invention is preferably constructed of two sides formed together as illustrated in FIG. 3, such that hollow space remains inside to provide the fish lure with a tendency toward flotation, causing the lure to remain in an upright position as it runs through the water. One side 13 of the fish lure is shown, and typical screw means for attaching the eyelets 26 and 28 are shown. Other means for attaching the eyelets include utilizing a double eyelet wherein one eyelet attaches inside the fish lure and the other side conventionally extends outside the fish lure to connection to a hook or line.

In FIG. 4 is shown a side view of the fish lure 10 of the present invention. Flange 20 is shown curving down to forward tip 22 and eyelets 26, 28 and 30 are shown attached to the fish lure 10. The arcuate shape of the rear portion 12 is important to the balance of the fish lure 10 in its operation which will be explained later.

The generally oval cross section of the fish lure is evident in FIG. 5. Flange 18 and 20 are shown bounding the upper surface 16. The rear surface 12 is shown with eyelet 28 extending from the underside; hollow space 26 is shown inside the fish lure and represents the space between the two halves of the fish lure. As previously noted, the fish lure of the present invention is constructed with hollow space inside so as to cause the fish lure to float and remain in an upright position as it runs through the water.

In operation, that portion of the water that hits the large flat head 16 of the fish lure 10 to the rear of the connecting eyelet 30, forces the tail section 12 to rapidly flip back and forth as shown at 34 in FIG. 2. The general arcuate shape of the body in connection with the size and shape of the head 16 causes the tail section 12 to swing about an axis toward the front of the lure. This is important in order not to have the front end do most of the swinging. Flanges 18 and 20 on the side of the head 16 also provide stability to the front of the lure 10, thus allowing the tail section 12 to do the movement. The fact that the head is curved allows the water to slide off more easily, causing a narrow, rapid tail action as opposed to wide, lazy action.

Due to the triangular shape of head 16, the section in front of eyelet 30, has a smaller surface than the portion of the head to the rear of the eyelet. Because of the curvature of the head, the water strikes the smaller forward section of surface 16 at a different angle than it hits the rear of head 16, causing the lure to roll slightly. When the lure rolls, however, instead of rolling back like other prior art lures mentioned above, the rapid tail flipping causes the lure to run slightly in the direction pointed because of the roll. The lure will run as much as four or five lure widths off to the side during one of these erratic darting maneuvers, then will correct itself and return to the center line. The rapid, short tail swing occurs regularly and consistently while the lure darts from side to side erratically, constituting this very unique action of the fish lure in water. The tail action is a very rapid motion while the darting from side to side is less frequent, that is, several tail swings take place during and between each dart from side to side.

This very unique swimming, darting action is a direct result of the curved triangular shaped head with flanges on the side — in and of itself — and in conjunction with the fact that it tapers sharply at the rear or wide end of the triangle to an arcuate narrow body that also extends up under the broad head to the nose.

It is understood that the fish lure of the present invention is readily adaptable for use as bait for different size fish, the only requirement being that the physical size of the fish lure be made bigger or smaller, depending upon the size and type of fish that it is desired to be caught.

From the foregoing, those skilled in the art will readily understand the nature of the construction of the invention, its operation, and the manner in which it achieves all the advantages as set forth in the foregoing, as well as the many additional advantages that are apparent from the detailed description.

The foregoing disclosure is representative of a preferred form of the invention and is to be interpreted in an illustrative rather than a limiting sense, the invention to be accorded the full scope of the claims appended hereto.

What is claimed is:

1. A fish lure comprising a body with a tendency toward flotation having its longitudinal axis arcuate throughout its length and presenting a top convex surface and a bottom concave surface and having a front portion and a tail portion, a broadened head portion positioned over the extending laterally throughout its length beyond said front portion and being integral therewith, the upper surface of said head throughout its length being arcuate in longitudinal section and relatively flat in transverse section, said head having an attachment means on its top surface, an appreciable distance in from its forward end for connecting to a line, the lure configuration being such as to result in a combined sideward darting and tail swinging motion.

2. The fish lure of claim 1 in which the front and tail portions of the body are tapered.

3. The fish lure of claim 1 in which the body has a vertical thickness greater than its lateral thickness.

4. The fish lure of claim 1 wherein the body is of generally oval cross-section.

* * * * *

UNITED STATES PATENT OFFICE
CERTIFICATE OF CORRECTION

Patent No. 3,702,035          Dated November 7, 1972

Inventor(s) Melkiah E. Pope

It is certified that error appears in the above-identified patent and that said Letters Patent are hereby corrected as shown below:

Column 2, line 31, after "shape" insert -- . --

Column 4, line 30, after "over" the word "the" should be --and--

Signed and sealed this 3rd day of July 1973.

(SEAL)
Attest:

EDWARD M. FLETCHER, JR.
Attesting Officer

Rene Tegtmeyer
Acting Commissioner of Patents